Patented Feb. 21, 1928.

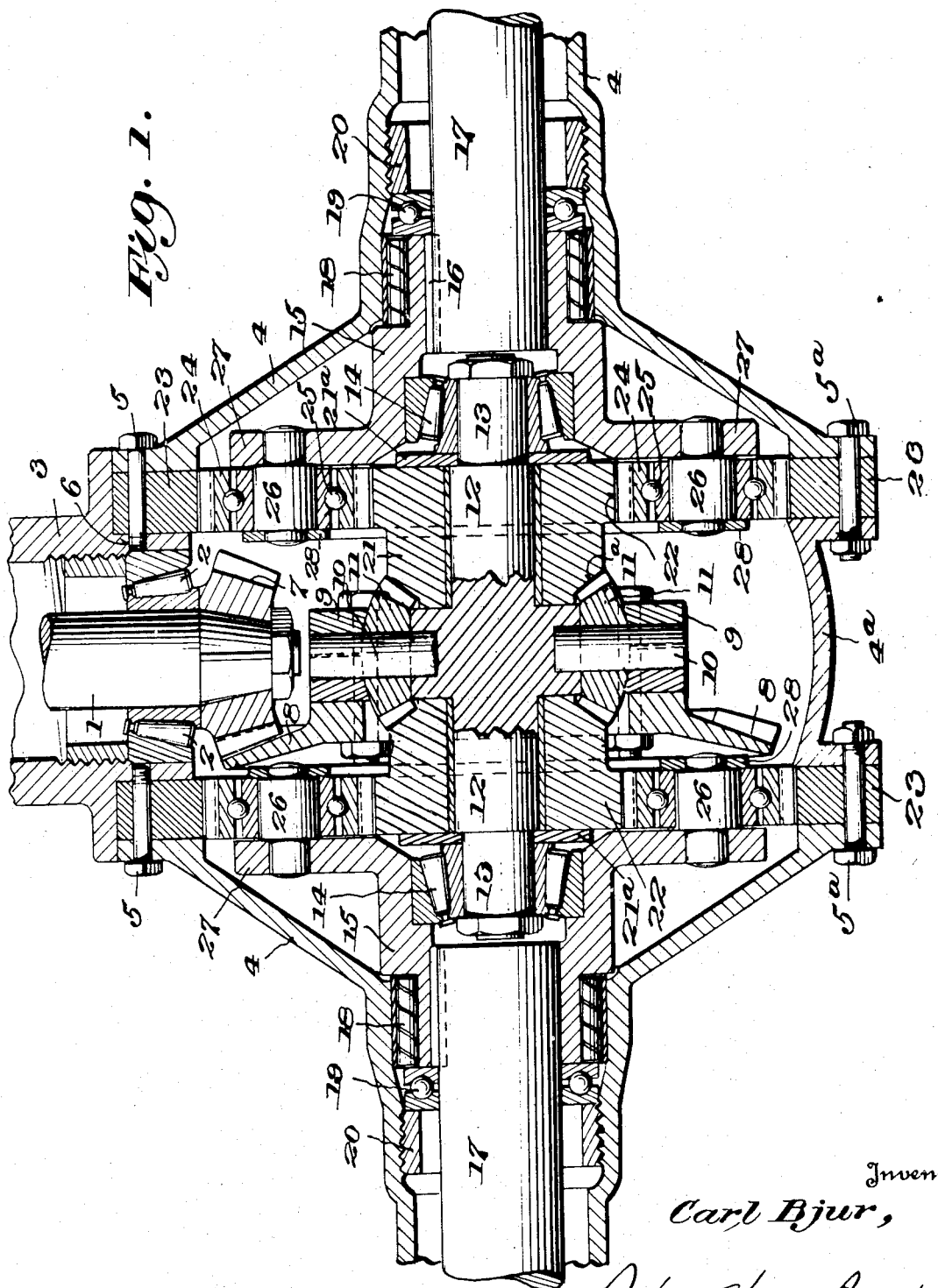

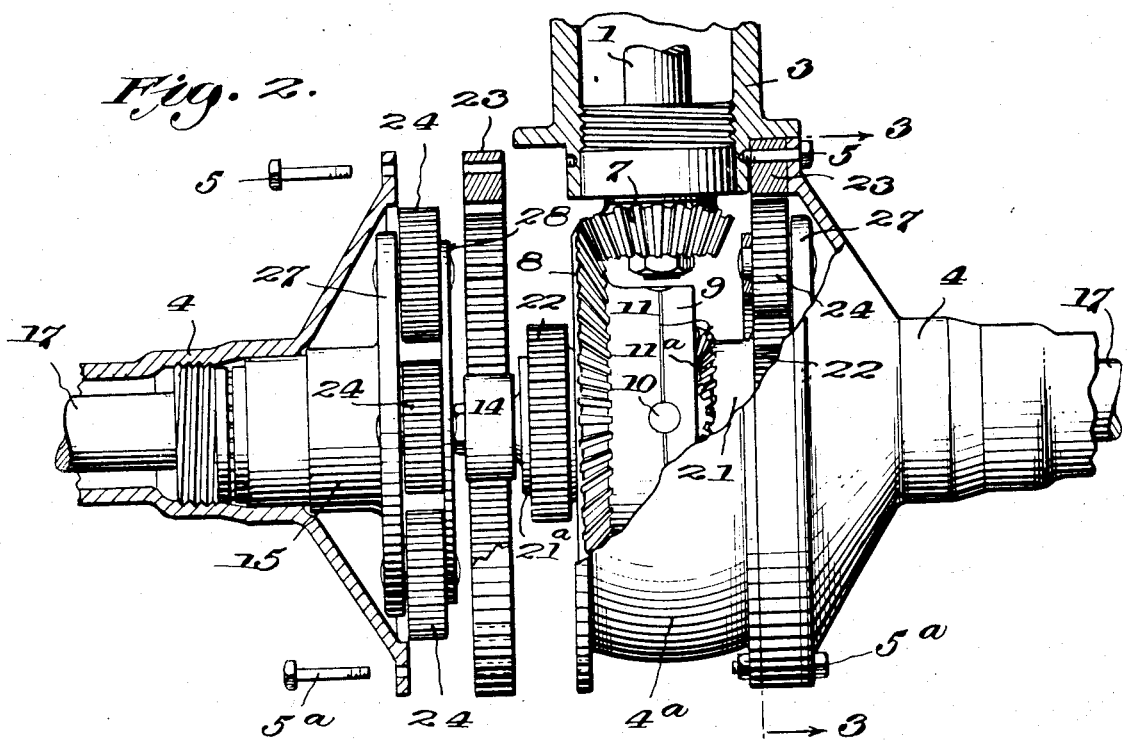
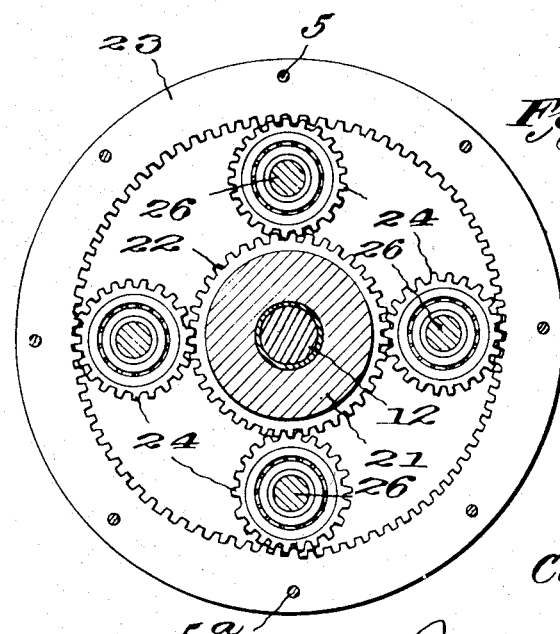

1,660,113

UNITED STATES PATENT OFFICE.

CARL BJUR, OF YAKIMA, WASHINGTON.

REAR AXLE FOR MOTOR VEHICLES.

Application filed November 17, 1926. Serial No. 148,883.

This invention relates to motor vehicles, and more particularly to a rear axle construction therefor.

One of the objects of the invention is to provide an improved construction of differential housing and differential gearing, the housing being formed of axially separable sections so arranged that, when separated, the differential gearing as a unit may be removed.

Another object is to simplify the construction of such mechanism by mounting the ends of the stub shaft carrying the differential spider in bearings supported directly by the adjacent ends of the driven or live axle sections.

It has heretofore been proposed to interpose planetary reduction gearing between the differential gearing and the driven axle sections, such planetary gearing being enclosed within the differential housing. The present invention embodies this feature also, and seeks to improve the construction by so mounting the differential and planetary gearing that all parts thereof are in a common chamber, whereby lubricant placed in said chamber will thoroughly reach all of said gearing.

Other specific objects will hereinafter appear.

In order that the invention may be readily understood, reference is had to the accompanying drawings forming part of this specification, and in which:—

Figure 1 is a longitudinal section through my improved differential housing and associated parts, showing the differential and planetary reduction gearing;

Figure 2 is a sectional plan of the same on a somewhat reduced scale, and showing the method of removing the differential gearing; and Figure 3 is a transverse section substantially on the line 3—3 of Figure 2, looking in the direction of the arrow.

Referring to the drawings in detail, 1 designates the usual propeller shaft which is mounted in suitable bearings 2 in a casing 3. The bearings 2 are preferably of the anti-friction thrust type.

The casing 3 is secured to the axle casing and differential housing, which structure comprises a pair of end sections 4 and a central section 4ª, such sections being axially separable. The enlargements on the ends of sections 4, together with the section 4ª, constitute the differential housing. The parts are secured together by means of bolts 5 and 5ª, some of which bolts may enter threaded sockets in the end of the casing 3, as shown at 6 in Fig. 1.

On the end of propeller shaft 1 is secured a bevel pinion 7 which meshes with a bevel gear 8 secured to a ring 9 forming part of the differential. Pins or studs 10 are set radially into the ring 9 and into a boss on a stub shaft 12 concentric with said ring, such boss, pins and ring constituting a spider. Journaled on the pins 10 are a plurality of bevel planetary pinions 11. These pinions mesh at each side of the spider with a corresponding bevel gear 11ª formed at one end of a sleeve 21 which is journaled on the stub shaft 12.

The extreme ends of the stub shaft 12 are reduced in diameter, as shown at 13, and each of these reduced ends is journaled in anti-friction thrust bearings 14 set in a central recess or pocket in a bearing member 15 keyed as at 16 to the adjacent end of the driven axle section 17, and forming a rigid part thereof. The outer end of the member 15 is reduced in diameter to constitute a journal which is supported on roller bearings 18 interposed between such journal and the axle casing 4. Beyond the end of the member 15 is mounted a thrust bearing 19, preferably of the ball type, which is held in position by means of an adjustable bushing 20 threaded into the axle casing.

It will be apparent that by turning these bushings 20, by means of a suitable tool, the thrust bearings 19, and with them the members 15, may be adjusted axially. This axial adjustment is transmitted through the roller thrust bearings 14 and washers 21ª which surround the stub shaft, to such stub shaft and the sleeves 21, and by this means it will be seen that the bevel gear 8 may be kept in proper mesh with the pinion 7. This pinion and the propeller shaft may also be adjusted axially of the casing 3 in the same manner, if desired.

From the foregoing it will be seen that I have provided a differential gearing wholly supported in recessed bearing members, which, as shown, are carried by the adjacent ends of the driven axle sections, thus greatly simplifying the construction and reducing friction.

On the outer ends of the sleeves 21 journaled on the stub shaft 12 are formed spur gears 22, and mounted in the same plane with these gears and concentric therewith are a pair of internal ring gears 23. These ring gears are rigidly secured to the axle housing by means of the bolts 5 and 5ᵃ, as clearly shown in Fig. 1.

Interposed between each gear 22 and 23 are a plurality of planetary pinions 24. These are preferably mounted on ball bearings 25 supported on pins 26 carried by a flange 27 formed on the bearing member 15. The inner ends of the pins 26 are connected by means of a ring 28.

From this it will be seen that power is transmitted from the bevel gear 8 through the differential gears 11 and 11ᵃ, sleeves 21, gears 22 and 23, and planetary pinions 24 to the flanged members 15, and thence to the driven axle sections 17. Thus, a complete reduction is effected within the differential housing.

It will be particularly noted that all of the differential and planetary gearing, above described, is mounted in a common chamber in the differential housing. By virtue of this arrangement it is obvious that lubricant placed in the differential housing will reach all parts of this gearing and thoroughly lubricate the same. This is a distinct advantage over prior constructions and in which the differential gearing is enclosed within a chamber separate from the planetary gearing.

By reference to Fig. 2, the method of assembling and removing the parts of my improved gearing will be apparent. By taking out the bolts 5 and 5ᵃ at the left hand side of the assembly, the left hand section 4 of the casing, and with it the flanged member 15 and planetary gears, may be shifted axially to the left. The entire differential gearing, including the gears 8, 11 and 11ᵃ, and the sleeves 21 and gears 22, can then be withdrawn endwise as a unit, and removed from the housing. Thus, the differential gearing is readily accessible for inspection, repairs or renewal at any time, and may be replaced without disturbing the planetary gearing at the right hand side of the housing, and without removing the propeller shaft or its pinion.

From the foregoing, it is thought that the many advantages of my improved design will be readily appreciated by those skilled in the art, without further discussion.

What I claim is:—

1. In a vehicle axle, the combination with an axle casing, of driven axle sections journaled in said casing, and differential gearing between the inner ends of said driven axle sections, said gearing including a bevel gear and spider, a stub shaft rigid with said bevel gear and spider, members rigid with the ends of said driven axle sections carrying thrust bearings in which thrust bearings the ends of said stub shaft are journaled, means for transmitting power from said bevel gear to said driven axle sections, and means for axially adjusting said thrust bearings, whereby said bevel gear may be maintained in proper mesh with the usual propeller shaft pinion which drives it.

2. In a vehicle axle, the combination with an axle casing, of driven axle sections journaled in said casing, and differential gearing between the inner ends of said driven axle sections, said gearing including a differential spider, and a stub shaft rigid with said spider, bevelled pinions carried by said spider, a sleeve journaled on said stub shaft at each side of said spider, said sleeve having at one end a bevelled gear meshing with said pinions, and provided at the other end with a second gear, a fixed internal ring gear surrounding and in the plane of said second gear, a flanged member secured to the end of each driven axle section, and planetary pinions carried by said flanged member and engaging both with said second gear and said internal ring gear, said stub shaft being journaled at its ends in the centers of said flanged members, and wholly supported thereby.

3. In a vehicle axle, an axle housing, aligned live axle sections journaled in said housing with their adjacent ends spaced apart, said ends being provided with bearing receiving means, a differential gearing assembly interposed between the spaced ends of said live axle sections and comprising a driving gear, a stub shaft, a spider having radial pins rigid with said stub shaft and carrying bevelled pinions, and a pair of bevelled gears with which said pinions mesh, and means for transmitting power from said bevelled gears to the respective live axle sections, the said stub shaft carrying said differential gearing assembly being wholly supported in the said bearing receiving means, whereby, when one of said live axle sections is shifted axially away from the other, the entire differential assembly may be removed as a unit.

4. In a vehicle axle, the combination with an axle casing, of driven axle sections journaled in said casing, recessed members secured on the inner ends of said axle sections, differential gearing between the inner ends of said driven axle sections, said gearing including a differential spider having bevelled pinions, a stub shaft carrying said spider, and a bevelled gear journaled on each side of said spider on said stub shaft and meshing with said pinions, and driving connections between said bevelled gears and said recessed members, the ends of said stub shaft being journaled in and supported wholly by the recessed members secured on the adjacent ends of said driven axle sections.

5. In a vehicle axle, an axle housing comprising a plurality of axially separable sections, alined live axles journaled in said housing with their adjaceint ends spaced apart, differential gearing interposed between the spaced ends of said live axles and comprising a driving gear, a stub shaft, a spider having radial pins rigid with said stub shaft and carrying bevelled pinions, and a pair of bevelled gears journaled on and supported by said stub shaft, with which gears said pinions mesh, driving connections between said gears and said live axles, and means rigid with said live axles for wholly supporting said stub shaft, whereby, when one of the housing sections is separated axially from the adjacent section, the entire above mentioned differential gearing assembly may be removed as a unit, from the housing.

6. In a vehicle axle, the combination with an axle casing, of driven axle sections journaled in said casing, with their adjacent ends spaced apart, differential gearing between the said ends of said driven axle sections, said gearing including a differential spider having beveled pinions, a beveled gear at each side of said spider and meshing with said pinions, a stub shaft carrying said spider and beveled gears and on which the latter are journaled, driving connections between said beveled gears and said driven axle sections, and a pair of bearing members having alined central recesses in which the ends of said stub shaft are journaled and wholly supported.

7. In a vehicle axle, an axle housing comprising a plurality of axially separable sections, alined live axles journaled in said housing with their adjacent ends spaced apart, differential gearing interposed between the spaced ends of said live axles and comprising a driving gear, a stub shaft, a spider having radial pins rigid with said stub shaft and carrying bevelled pinions, and a pair of bevelled gears journaled on and supported by said stub shaft, with which gears said pinions mesh, driving connections between said gears and said live axles and a bearing member within each axle housing section, said members having alined central recesses in which the ends of said stub shaft are wholly supported, whereby, when one of the housing sections is separated axially from the adjacent section, the entire above mentioned differential gearing assembly may be removed as a unit, from the housing.

In testimony whereof I affix my signature.

CARL BJUR.